United States Patent [19]

McCall, Jr.

[11] 4,215,323

[45] Jul. 29, 1980

[54] INSTABILITY AND REGENERATIVE PULSATION IN OPTICAL CAVITIES

[75] Inventor: Samuel L. McCall, Jr., Gillette, N.J.

[73] Assignee: Bell Telephone Laboratories, Incorporated, Murray Hill, N.J.

[21] Appl. No.: 869,368

[22] Filed: Jan. 13, 1978

[51] Int. Cl.$^2$ .............................................. H01S 3/10
[52] U.S. Cl. .................................... 332/7.51; 330/4.5; 455/609
[58] Field of Search ...................... 356/112; 332/7.51; 330/4.5; 307/88.3, 312; 250/199; 350/266

[56] References Cited

U.S. PATENT DOCUMENTS

| 3,243,722 | 3/1966 | Billings | 331/94.5 F |
| 3,628,173 | 12/1971 | Danielmeyer | 250/199 |

FOREIGN PATENT DOCUMENTS 381054  5/1973  U.S.S.R. ...................... 332/7.51

OTHER PUBLICATIONS

Lugovia, "On the Theory of a Non-Linear Optical Resonator," 7/77, pp. 743-756, Optica Acta., vol. 24, #7.
Felber et al., "Theory of Nonresonant Multistable Optical Devices", 6/76, pp. 751-753, Appl. Phys. Lett., vol. 28, #12.
McCall, "Instabilities in C-W Light Propagations . . .", 4/74, pp. 1515-1523, Phys. Rev. A, vol. 9, #4.

*Primary Examiner*—Nelson Moskowitz
*Attorney, Agent, or Firm*—Samuel H. Dworetsky

[57] ABSTRACT

A new mode of operation of an optical cavity is disclosed. In this "regenerative pulsation" mode, a substantially nonvarying input yields an output consisting of a train of pulses. Fractional modulations exceeding 90 percent are demonstrated.

25 Claims, 4 Drawing Figures

INSTABILITY AND REGENERATIVE PULSATION IN OPTICAL CAVITIES

BACKGROUND OF THE INVENTION

1. Field of the Invention

This invention involves regenerative pulsation in the operation of an optical cavity.

2. Description of the Prior Art

The advent of the laser and of solid-state light-emitting diodes has rekindled interest in transmitting information via electromagnetic waves in the optical region of the spectrum. Significant efforts have been expended in developing the optical fiber into an appropriate low-loss transmisson medium. More recent efforts have included the design and development of integrated optical circuitry which would permit direct processing of the optical signal without transformation into an electrical signal. Recent work has suggested such a direct technique for amplifying optical signals through the use of a cavity-enclosed nonlinear medium. The properties of the cavity are combined with the dispersive and/or absorptive properties of the medium to yield an input-output curve which displays gain. Such work is disclosed in commonly assigned U.S. applications Ser. No. 711,421 and Ser. No. 735,989 and U.S. Pat. No. 4,012,699.

A specific embodiment of such a cavity-enclosed nonlinear medium is disclosed in U.S. application Ser. No. 732,755. In that embodiment, an electro-optic crystal, whose index of refraction is a function of applied voltage, is used as the medium in the optical cavity. The response of the refractive index of the medium is effectively made nonlinear by varying the voltage applied to the medium as a function of the power transmitted through the medium. In this manner the index of refraction is made dependent on the power applied to the medium. The medium thereby displays nonlinear transmission properties.

SUMMARY OF THE INVENTION

This invention is an optical cavity which operates in a regenerative pulsation mode. A substantially nonvarying optical input results in an optical output comprising a train of pulses. The optical properties of the cavity, or of the cavity-enclosed medium, or combinations thereof, are adjusted so as to yield the regenerative pulsation effect.

DETAILED DESCRIPTION

Introduction

Figure 1:
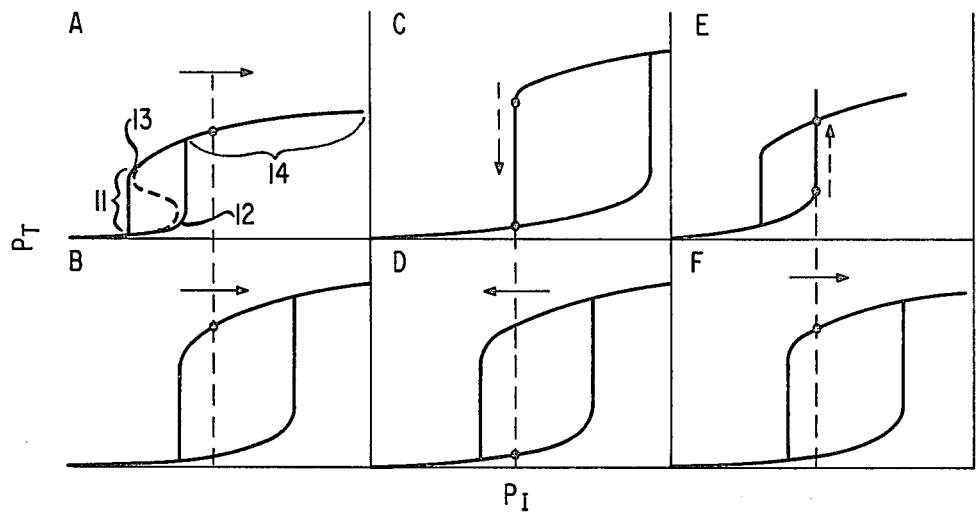
FIG. 1 is a schemtic representation of the input-output curves for a cavity-enclosed nonlinear medium.

This invention involves the operation of an optical cavity in a regenerative pulsation mode. Prior work, referred to above, discloses operative cavity modes which are characterized by differential gain and bistability. An exemplary characteristic curve associated with the bistable mode of operation is shown in FIG. 1A. In this figure, input power is plotted on the abscissa and output power is plotted on the ordinate. The calculated steady-state mathematical solution for region 11 is shown in broken line form and reveals that in this region the input-output relationship is multivalued and has a negative slope. The actual operating behavior, however, is shown in solid line form and reveals bistability. As the input power increases from zero to point 12 instability appears and the system switches at point 12 from the lower, nontransmitting, "off" mode to the upper, transmitting, "on" mode. As the power increases further beyond 12, a stable single-valued region is encountered. If the input power is now decreased, a point of instability will be encountered at point 13, at which point the system will switch from the "on" to the "off" mode. It is thus seen that the multivalued region 11 associated with the mathematical solution, is translated in physical terms to a region of instability, specifically bistability. While as of yet it has not been mathematically proven that the region of negative slope *must* be unstable, no physically reasonable parameters have been found which will result in a stable mode in this region. The previously disclosed bistability is an example of the instability associated with the negative slope region.

In contradistinction to the negative slope region 11, it had previously been believed that only stable modes of operation were associated with the positive slope region, specifically region 14 in FIG. 1A. Applicant has, however, shown that regions of positive slope may display instability; and specifically such instability may take the form of regenerative pulsation, so that a cw optical input will result in a pulsed optical output.

While a mathematical demonstration of this effect is presented below the effect may be heuristically demonstrated by an nonrigorous consideration of FIG. 1. This figure is a schematic representation of the input-output curve associated with a cavity-enclosed nonlinear medium. The system parameters are tuned to yield the bistable characteristic shown in FIG. 1A, and the input power is such that operation is at the point indicated by the heavy dot. This input power remains constant, and as indicated in FIG. 1A, results in the device being in a transmitting "on" mode. In this mode the intracavity power is high and the nonlinear medium warms up. Thermally dependent medium parameters will then result in a shift of the characteristic curve in the direction shown by the arrow in FIG. 1A although the input power and other operating parameters remain fixed. The shift in the curve to the position shown in FIGS. 1B and 1C results in a switch of the system to the "off" mode. Low intracavity power in this mode results in cavity cooling, a subsequent shift of the characteristic curve, and switch in the operating mode, as shown in FIGS. 1D-1E. It may be seen from this treatment that a constant power input can result in a pulsed output. Furthermore, the pulsed output is regenerative, in that the pulsation is a natural result that follows with a constant power input, and does not require external switching.

The above example is beneficial to the extent that it exemplifies regenerative pulsation. However, the solution represented by FIG. 1 is nonrigorous to the extent that thermal effects are not embodied in the individual curves of FIG. 1. If the thermal contribution is included in the steady-state input-output characteristic curve, then a simple single-valued gain curve with positive slope may result. In such a situation the example demonstrates the feasibility of regenerative pulsation in a positive slope region of the characteristic curve. It was previously believed that the positive slope portion of the characteristic curve was stable. However, applicant has shown, both by means of the above example and in the detailed mathematical description to follow, that instability may, in fact, exist in the positive slope single-valued portion of the characteristic curve. Since this region is single-valued, there is no other steady-state value which the system may assume, and hence any instability is exhibited as regenerative pulsation rather than as bistability. A detailed mathematical description of these regions will further assist the practitioner skilled in the art to fully appreciate this invention.

Theoretical Considerations

Equation (1) (derived in detail by H. M. Gibbs et al in the *Physical Review Letters*, 36, (1976), at page 1135) gives a relationship between the input and output optical electric field envelopes, $E_I$ and $E_T$ respectively, $$E_I = E_T(1+i\beta) + \Gamma(v-iu) \qquad (1)$$

when $\beta$ is a mistuning parameter, v and u represent components of the nonlinear polarization and $\Gamma$ describes the mirror reflectivities of a Fabry-Perot cavity, the cavity length, and other parameters. The primary approximations involved are that the light is plane wave, and that the cavity buildup time is very short. With $P_I = |E_I|^2$, $P_T = |E_T|^2$, one finds a low frequency differential power gain $G = dP_T/dI$ given by $$G^{-1} = (1 + \Gamma v/E_T)(1 + \Gamma \frac{dv}{dE_T} + v\frac{d\Gamma}{dE_T}) + \qquad (2)$$
$$(\beta - \Gamma u/E_T)(\beta + E_T\frac{d\beta}{dE_T} - u\frac{d\Gamma}{dE_T} - \Gamma \frac{du}{dE_T})$$

where here and elsewhere, derivatives such as $dv/dE_T$ are taken using steady-state results such as $v(E_T)$ with $E_T$ and $dE_T$ real.

With $E_T$ real, v and u are absorptive and dispersive components of polarization, respectively. Under a phase-shift transformation $E_T \to E_T(e^{i\phi})$, v−iu undergoes the same phase shift, i.e., $v-iu \to (v-iu)(e^{i\phi})$, so that one may write $$\Delta v = \frac{dv}{dE_T} L_v \Delta E_T^{(R)} + \frac{u}{E_T} l_v \Delta E_T^{(I)} \qquad (3)$$

and $$\Delta u = \frac{du}{dE_T} L_u \Delta E_T^{(R)} - \frac{v}{E_T} l_u \Delta E_T^{(I)} \qquad (4)$$

where $E_T$ is real, $\Delta E_T = \Delta E_T^{(R)} + i\Delta E_T^{(I)}$ with $\Delta E_T^{(R,I)}$ real and infinitesimal quantities of arbitrary time dependence, and $L_v, L_u, l_v, l_u$ are linear causal operations with unity values at zero frequency. Equations (1), (3) and (4) allow an eigenvalue equation $F(\gamma) = 0$ for complex growth rates $\gamma$, where $$F(\gamma) = (1 + \Gamma\frac{dv}{dE_T} L_v + v\frac{d\Gamma}{dE_T} L_\Gamma)(1 + \Gamma\frac{v}{E_T} l_u) \qquad (5)$$
$$+ (\beta - \Gamma\frac{u}{E_T} l_v)(\beta + E_T\frac{d\beta}{dE_T} L_\beta - u\frac{d\Gamma}{dE_T} L_\Gamma)$$
$$- \Gamma\frac{du}{dE_T} L_u),$$

and $L_\beta$ and $L_\Gamma$ are operators, similar to $L_v$, etc., that describe the time dependence of the variations in $\beta$ and $\Gamma$ due to a change in $E_T$. This is obtained by substituting Equations (3) and (4) into the differential of Equation (1), then setting $\Delta E_I = 0$ and $\Delta E_T$ is proportional to $\exp(\gamma t)$. If a root of $F(\gamma) = 0$ has a positive real part, the corresponding steady-state solution is unstable.

Applicant has shown that if the slope $dP_T/dP_I$ is positive, examples exist wherein the region is not stable. For example, it may be proper to describe the polarization through a nonlinear refractive index. Thus $$u + iv = \chi(P_T)E_T, \qquad (6)$$

where $\chi$ is real, so that $l_v = 1$, $$L_u = \chi + 2P_T(d\chi/dP_T)l_\chi, \qquad (7)$$

and $l_u$, $L_v$ are undefined, since v and $dv/dE_T$ are zero with $E_T$ real. The operator $l_\chi$ is defined by $\Delta\chi = (d\chi/dP_T)l_\chi \Delta P_T$, and it is assumed that $l_\chi(\infty) = 0$. This case is clearly in conflict with the requirement $L_u(\infty) = 0$. However, in this case, $F(\gamma)$ varies from $G^{-1}$ at $\gamma = 0$ to $1 + (\beta - \Gamma\chi)^2$ at $\gamma = \infty$, so that negative slope regions are nevertheless unstable.

An example of positive slope instability is provided by a particular type of nonlinear refractive index. Using Equations (6) and (7) and the conditions thereby, one finds that Equation (5) reduces to $$F(\gamma) = T^{-1} + (G^{-1} - T^{-1})l_\chi \qquad (8)$$

where T is the device transmission $P_T/P_I$ at the operating point. If $l_\chi$ achieves a value $$l_\chi(\gamma) = (1 - T/G)^{-1} \qquad (9)$$

for some positive $\gamma$, then $F(\gamma) = 0$ and the operating point is unstable. If $G > T$, then $(1-T/G)^{-1} > 1$. If $G < T$, then $(1-T/G)^{-1} < 0$. The interval [0,1] is excluded, so that if $0 < l_{102} < 1$ for $0 < \gamma < \infty$, all positive slope regions are stable. If $l_\chi$ lies outside this interval the medium and/or cavity parameters may be set so that Equation (9) is satisfied for some positive $\gamma$ to yield positive slope regions that are unstable.

Suppose that the nonlinear refractive index is the difference of two quantities $$\chi = \chi_1 - \chi_2 \qquad (10)$$

where $T_1 \chi_1 + \chi_1 = (a+1)A P_T$ and $T_2 \chi_2 + \chi_2 = aA P_T$ specify the dynamics of $\chi$, where A is related to the magnitude of the steady-state refractive index while a is related to the relative contributions of $\chi_1$ and $\chi_2$. Then $$l_\chi(\gamma) = (a+1)(1+\gamma T_1)^{-1} - a(1+\gamma T_2)^{-1} \qquad (11)$$

By choosing values of a and $T_1/T_2$, $l_\chi$ may assume values between zero and a maximum value greater than one, or between a negative minimum value and one, when $\gamma$ varies from zero to infinity. Then, as described above, the positive slope region may be made unstable if the cavity and/or medium parameters are fixed to satisfy Equation (9) for some positive $\gamma$. If only one steady-state output value exists for the given input then the output will undergo oscillations.

Practical Considerations

The inventive device in its broadest embodiment involves an optical cavity which exhibits regenerative pulsation in the positive slope region of the steady-state characteristic curve. Regenerative pulsation in this context alludes to a pulsation phenomenon which does not result from external stimulation but which rather reflects the internal time-dependent behavior of the described system. In order to clearly distinguish this invention from certain passive pulsed optical devices, such as mode-locked lasers, this invention is specifically limited to optical cavities enclosing a medium which is substantially free of amplifying inverted transitions. The cavity in which the medium lies may, in its broadest embodiment, be any type of optical cavity; but in specific embodiments such as those described in Equation (1) the cavity will be the widely used Fabry-Perot cavity. The medium within the optical cavity need not take an active role in the regenerative pulsation phenomenon. Such a passive role might be assumed in the case of an optical cavity which is substantially evacuated. In such a situation, the pulsation phenomenon may be effected by varying the "nonlinear" cavity mirror spacing in response to the optical output power, thereby altering the boundary conditions associated with the cavity. Equation (1) may describe such a configuration.

Other embodiments involve a cavity-enclosed nonlinear medium which does play an active role in the regenerative phenomenon. However, in such a situation the medium need not be inherently nonlinear. For example, it may be an electro-optic material with an applied voltage whose magnitude is responsive to the output of the cavity. The operation of a cavity-enclosed nonlinear medium in the regenerative pulsation mode may also be described by Equation (2).

For both the cavity-enclosed nonlinear medium and the evacuated cavity, if the eigenvalue equation associated with Equation (5) has a positive real part, then the corresponding steady-state solution is unstable. The nonlinear characteristics of the medium, both absorptive and dispersive, as well as the nonlinear characteristics of the cavity, are included in this equation. Equation (9) assumes that the only medium nonlinearity is associated with the medium refractive index. If the left-hand side of Equation (9) lies outside the interval [0,1] for some $\gamma$ with a positive real part the medium and/or cavity characteristics may be set so that Equation (9) is satisfied for some positive $\gamma$ to yield single-valued positive slope regions of the input-output characteristic curve that are unstable and undergo regenerative pulsation.

A specific example which displays regenerative pulsation involves a cavity-enclosed nonlinear medium whose nonlinear index of refraction may be described as the difference of two quantities which have different time-dependent behaviors.

Other specific embodiments involve the use of a solid-state material to perform the functions of both a nonlinear medium and the optical cavity. The solid-state material forms the medium while the transmission characteristics of the boundaries of the medium form the requisite optical cavity. In this, as well as in other embodiments, the thermal effects may play a role in the regenerative polarization phenomena. One specific way in which such thermal effects may participate involves the absorption of light by the medium and subsequent heating of the medium thereby introducing the thermally dependent contributions to the regenerative polarization phenomena.

In alternative specific embodiments the optical cavity may be enclosed in an opaque enclosure. The boundaries of the optical cavity may be curved and may more specifically comprise curved mirrors. The device may include means to input a cw optical beam and means to extract a pulsed wave output. Further details may include means for transmitting the pulsed wave output and means for utilizing the pulsed wave output. Such utilization means may include a pulsed amplitude modulator which modulates the output in a way that is representative of the information. Such utilization would enable application of this invention to communication systems.

EXAMPLE 1

Figure 2:
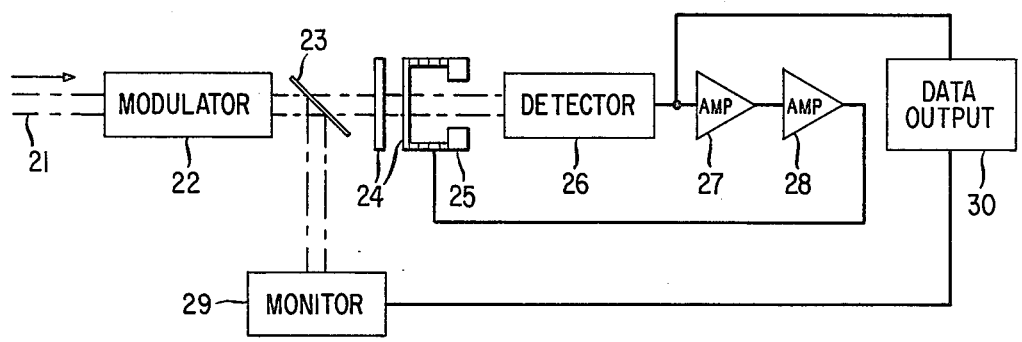
FIG. 2 is a specific embodiment of this invention.

As a demonstration of the regenerative phenomenon an optical cavity was established in a particular configuration which simulated a cavity-enclosed nonlinear medium whose nonlinear refractive index might be expressed as the difference of two quantities with differing time-dependent behaviors. The apparatus is schematically represented in FIG. 2. In this figure cw light 21 from a helium neon laser was passed through a modulator 22 which might be used to vary the magnitude of the light. The light then passed through a partially reflecting mirror 23 and into a Fabry-Perot cavity formed by two mirrors 24. The position of one of the Fabry-Perot mirrors is controlled by means of a piezoelectric drive 25. The output of the optical cavity is detected by means of an appropriate detector 26. Amplifiers 27 and 28 are used in feedback loop to the piezoelectric drive 25 so that the position of one of the mirrors is dependent on the power output from the cavity. Both the power out of the cavity, and the power into the cavity monitored by device 29, are recorded by an appropriate data acquisition device 30. In this specific embodiment the optical cavity does not contain a nonlinear medium. The amplifiers 27 and 28 feed to the piezoelectric drive a signal whose time dependence may be expressed as the combination of two different exponential responses to the output power. Mathematically the amplifier output was related to the amplifier input as described by Equation (11) with $a=5$, $T_1=$one-third of a second, $T_2=$two-thirds of a second. The motion of the cavity mirror then results in a time-dependent variation of the boundary condition at the mirror wall. This time-dependent variation of the boundary condition is essentially identical to that which would occur if the cavity mirror were stationary and the cavity enclosed a nonlinear medium with similar response characteristics. It may then be seen that the configuration of FIG. 2 essentially simulates a cavity-enclosed nonlinear medium with the requisite nonlinear medium characteristics. This embodiment may also be viewed as demonstrating regenerative pulsation in an optical cavity substantially free of a nonliner medium but which cavity displays nonlinear characteristics. Such a "nonlinear cavity" has associated with it parameters which depend on the magnitude of the power transmitted through the cavity.

Figure 3A:
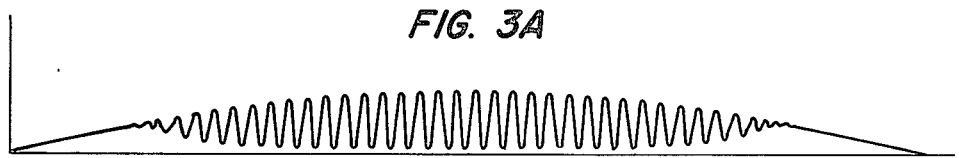
FIG. 3 shows the pulse train output which results when a cw input is applied to the embodiment of FIG. 2.
Figure 3B:
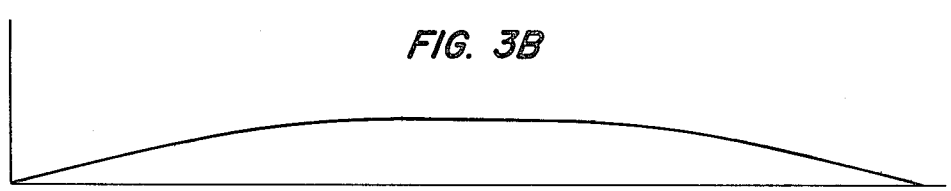

FIG. 3B shows the output of the Fabry-Perot and FIG. 2 shows the input to the Fabry-Perot in the experimentational configuration of FIG. 2. The fractional modulation exceeds 90 percent. The output power shown in FIG. 3A also displayed some right-to-left asymmetry as well as some peak structure both of which may be related to response time phenomena. The parameters a and $T_1/T_2$ were adjusted to yield insensitivity of the regenerative pulsation frequency to input power. Such systems can be phase locked to a separate frequency standard.

EXAMPLE 2

An optical cavity that displays regenerative pulsation in the positive slope steady-state regions of the curve may also be fabricated using an electro-optic material as the "nonlinear" medium. In this example, the medium is made to show effective nonlinearity by varying the voltage applied to the medium, in response to the output power. The amplifier in the feedback loop to the medium must be sufficient so that the voltage applied to the medium is of proper magnitude, and must have a response characteristic which may be expressed as the difference between two time-dependent terms. A specific embodiment involves response characteristics essentially identical to those in Example 1.

EXAMPLE 3

In this example, an optical cavity that displays regenerative pulsation is fabricated by including within the cavity a nonlinear medium whose nonlinear index of refraction may be expressed as the difference between two different terms, each with different response characteristics to applied light. Such a medium may be formed by juxtaposing ruby whose refractive index decreases with applied power near resonance, with another medium whose index of refraction increases with applied power. Such a cavity them may display regenerative pulsation near the resonance region in ruby.

What is claimed is:

1. An optical cavity enclosing a medium substantially free of amplifying inverted transitions, whose medium and/or cavity characteristics are adjusted so that the equation $F(\gamma)=0$ has a root with a positive real part and so that the associated dynamic input/output properties include regenerative pulsation in the positive slope steady-stated regions of the characteristic input/output curve.

2. The device of claim 1 wherein the optical cavity is a Fabry-Perot cavity.

3. The device of claim 2 wherein a nonlinear medium is enclosed within the Fabry-Perot cavity.

4. The device of claim 3 wherein the medium characteristics are such that the equation $F(\gamma)=0$ has a root with a positive real part.

5. The device of claim 3 wherein the cavity characteristics are nonlinear and the medium and nonlinear cavity characteristics are combined so that the equation $F(\gamma)=0$ has a root with a positive real part.

6. The device of claim 2 wherein the cavity is substantially free of any nonlinear medium.

7. The device of claim 6 wherein the cavity characteristics are nonlinear and are adjusted so that the equation $F(\gamma)=0$ has a root with a positive real part.

8. The device of claim 4 wherein $l_\chi(\gamma)=(1-T/G)^{-1}$ for some positive $\gamma$ and $l_\chi$ lies outside the range [0,1], when $\gamma$ varies from 0 to $\infty$.

9. The device of claim 5 wherein $l_\chi(\gamma)=(1-T/G)^{-1}$ for some positive $\gamma$ and $l_\chi$ lies outside the range [0,1], when $\gamma$ varies from 0 to $\infty$.

10. The device of claim 8 wherein the nonlinear refractive index of the medium can be expressed as the algebraic sum of two or more quantities each of which has associated with it a different response time to the application of optical power to the medium.

11. The devices of claims 1 through 10 wherein the regenerative pulsation frequency is substantially insensitive to input power.

12. The device of claim 10 wherein the device is phased locked to a separate frequency standard.

13. The device of claims 1 through 10 wherein the optical cavity is formed by the boundaries of the nonlinear medium.

14. The device of claim 13 wherein the regenerative polarization frequency is substantially insensitive to input power.

15. The device of claim 13 wherein the nonlinear medium is a solid.

16. The device of claim 4 where at least a part of the medium or cavity nonlinearity is due to absorption of light and subsequent heating.

17. The device of claim 5 where at least a part of the medium or cavity nonlinearity is due to absorption of light and subsequent heating.

18. The device of claim 1 in which the optical cavity is enclosed in an opaque enclosure.

19. The device of claim 1 in which the optical cavity comprises curved mirrors.

20. The device of claim 1 further including means to input a cw optical beam into the cavity and means to extract a pulsed wave output.

21. The device of claim 20 further including means for transmitting the pulsed wave output.

22. The device of claim 20 further including means for utilizing the pulsed wave output.

23. The device of claim 22 wherein said utilization means include a pulsed amplitude modulator.

24. The device of claim 23 wherein said pulsed amplitude modulator modulates the output in a way that is representative of information.

25. The device of claim 24 in a communication system.

* * * * *